United States Patent
Hiroi et al.

(10) Patent No.: US 10,139,314 B2
(45) Date of Patent: Nov. 27, 2018

(54) MISFIRE DETECTION DEVICE TO DETECT MISFIRE BASED ON A FREQUENCY ANALYSIS OF A ROTATION SIGNAL CORRELATED WITH A ROTATIONAL STATE OF AN INTERNAL COMBUSTION ENGINE

(71) Applicant: DENSO CORPORATION, Kariya, Aichi-pref. (JP)

(72) Inventors: Taiyo Hiroi, Kariya (JP); Daisuke Honda, Kariya (JP); Takanori Matsukawa, Kariya (JP); Takanobu Kajino, Kariya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 15/285,031

(22) Filed: Oct. 4, 2016

(65) Prior Publication Data

US 2017/0167952 A1 Jun. 15, 2017

(30) Foreign Application Priority Data

Dec. 11, 2015 (JP) ................................. 2015-242562

(51) Int. Cl.
| | |
|---|---|
| *G01M 15/11* | (2006.01) |
| *F02D 41/00* | (2006.01) |
| *F02D 41/28* | (2006.01) |
| *G07C 5/08* | (2006.01) |
| *F02D 41/14* | (2006.01) |

(52) U.S. Cl.
CPC ......... *G01M 15/11* (2013.01); *F02D 41/0097* (2013.01); *F02D 41/1498* (2013.01); *F02D 41/28* (2013.01); *G07C 5/0825* (2013.01); *F02D 2041/288* (2013.01); *F02D 2200/101* (2013.01); *F02D 2200/1015* (2013.01)

(58) Field of Classification Search
USPC ................ 73/114.02, 114.03, 114.04, 114.08
See application file for complete search history.

(56) References Cited

U.S. PATENT DOCUMENTS

| 5,303,158 | A | | 4/1994 | Kuroda | |
|---|---|---|---|---|---|
| 5,509,302 | A | * | 4/1996 | Drexel | .................. G01M 15/11 701/111 |
| 5,726,352 | A | * | 3/1998 | Mezger | .................. G01M 15/11 73/114.03 |
| 6,155,105 | A | * | 12/2000 | Klenk | .................... G01M 15/11 340/441 |
| 7,142,972 | B1 | * | 11/2006 | Naik | ..................... G01L 23/221 701/111 |

(Continued)

*Primary Examiner* — Eric S McCall
(74) *Attorney, Agent, or Firm* — Nixon & Vanderhye P.C.

(57) ABSTRACT

A rotation acquisition unit acquires a rotation signal correlated with a rotational state of an internal combustion engine. An analysis unit performs frequency analysis of the rotation signal acquired with the rotation acquisition unit. An inter-cylinder determination unit determines whether an inter-cylinder component is smaller than an inter-cylinder threshold representing occurrence of misfire. The inter-cylinder component is a frequency component of an inter-cylinder cycle. The inter-cylinder cycle is computed by dividing an ignition cycle, which is one burning cycle of the internal combustion engine, by a number of cylinders of the internal combustion engine.

6 Claims, 12 Drawing Sheets

(56) References Cited

U.S. PATENT DOCUMENTS

| | | | |
|---|---|---|---|
| 2003/0051538 A1* | 3/2003 | Hashiguchi | G01M 15/11 73/114.07 |
| 2003/0101797 A1* | 6/2003 | Nishimoto | G01M 15/11 73/35.01 |
| 2004/0237635 A1* | 12/2004 | Ohsaki | F02D 41/1498 73/114.07 |
| 2007/0261484 A1* | 11/2007 | Nishigaki | G01M 15/11 73/114.04 |
| 2015/0135810 A1* | 5/2015 | Koch | F02D 41/1498 73/114.05 |

* cited by examiner

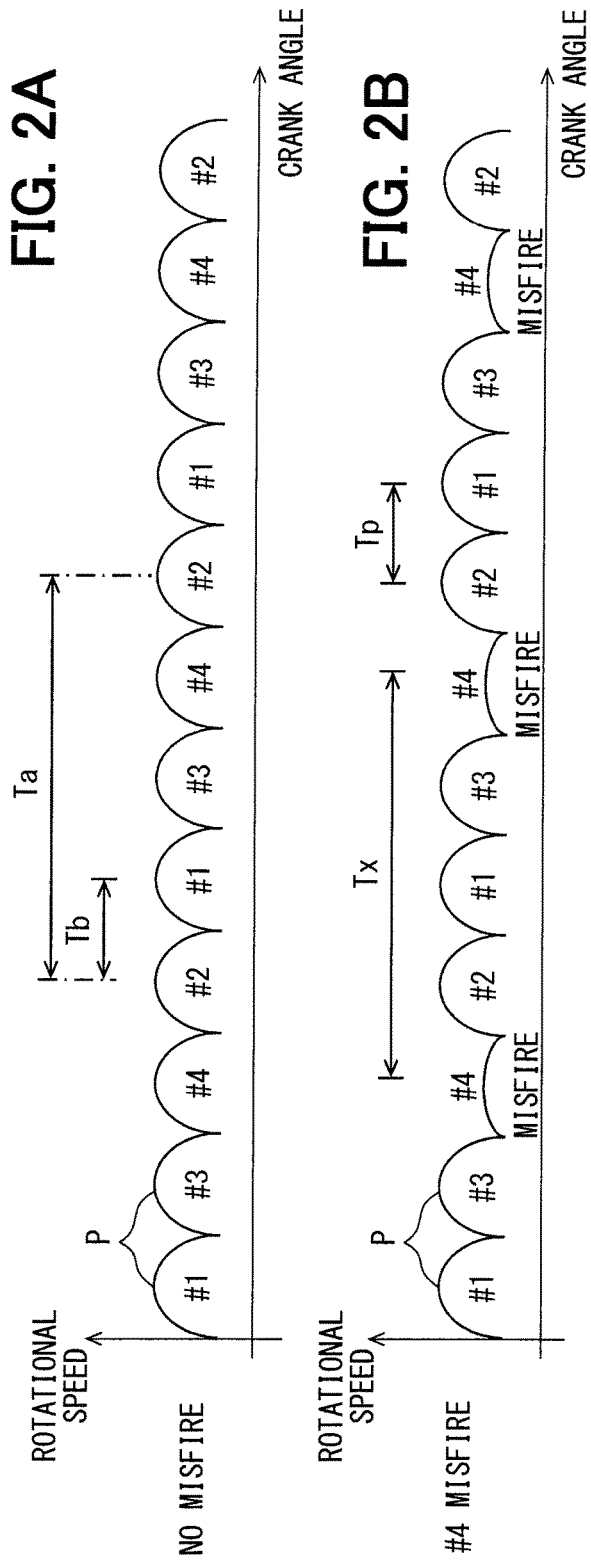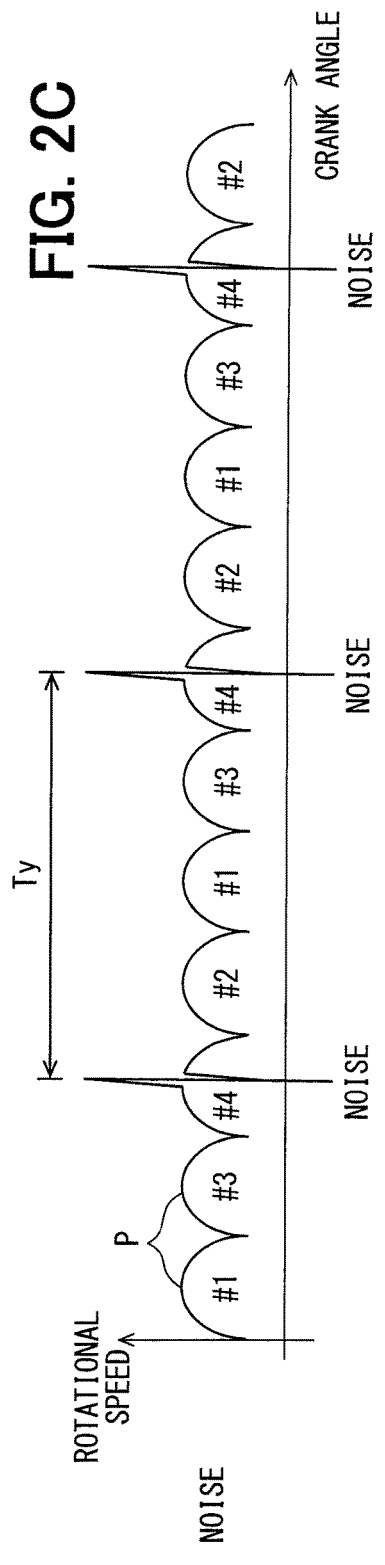

FIG. 8
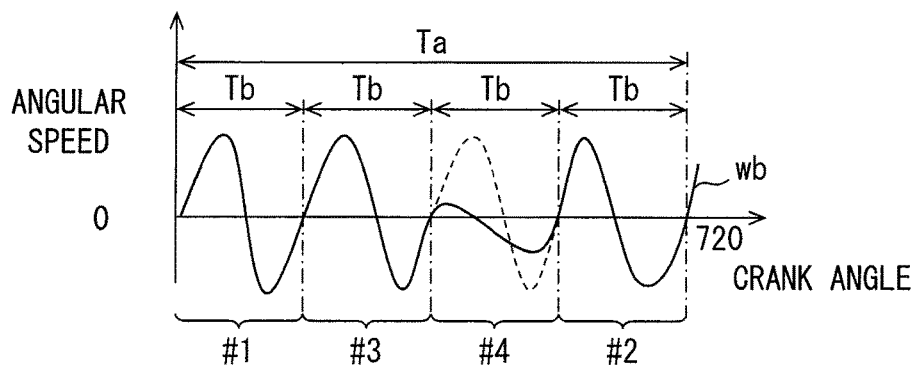
FIG. 9A  #1 CYLINDER
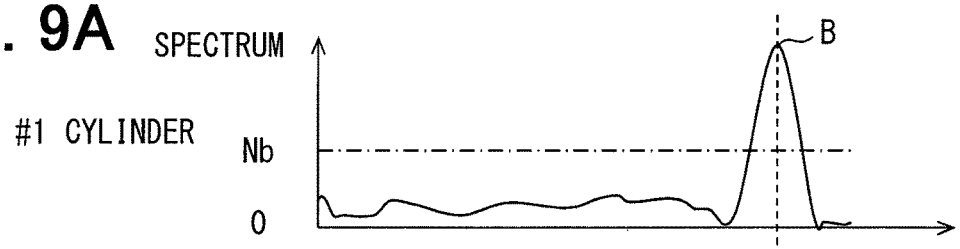
FIG. 9B  #3 CYLINDER
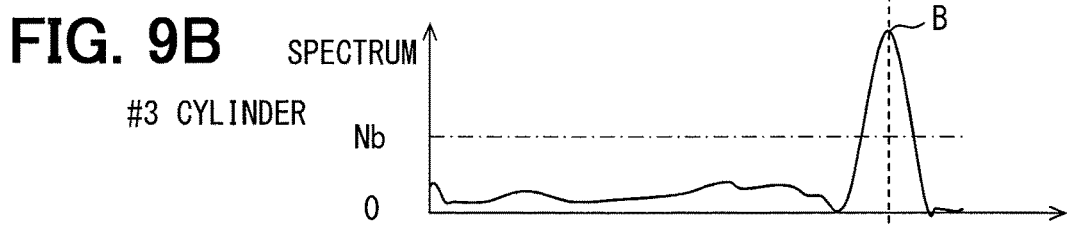
FIG. 9C  #4 CYLINDER
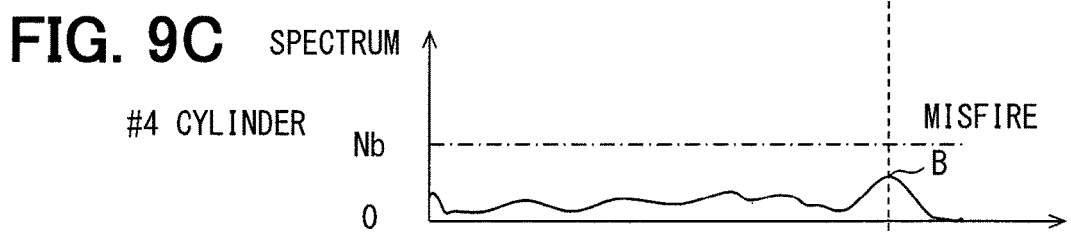
FIG. 9D  #2 CYLNDER
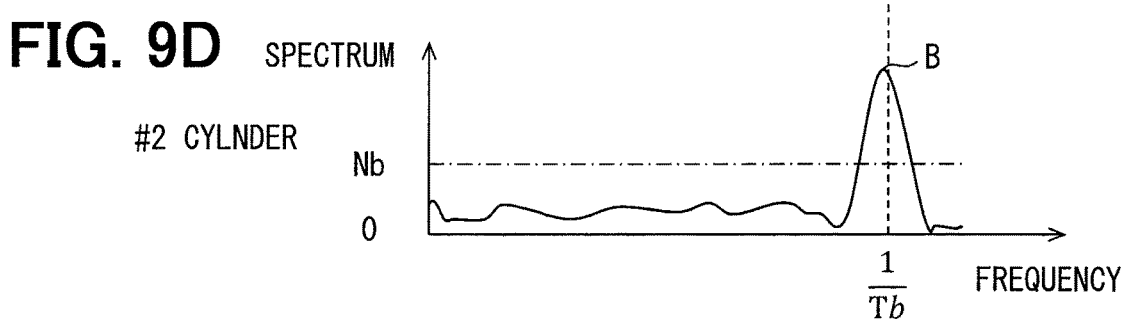

1 CYLINDER

3 CYLINDER

4 CYLINDER

2 CYLINDER

6-CYLINDER ENGINE

8-CYLINDER ENGINE

FIG. 19

| IGNITION ORDER (CYLINDER NUMBER) | IGNITION ORDER (deg. CA) | | | | | | | | | | | | | | | | | | | | | | | | |
|---|---|---|---|---|---|---|---|---|---|---|---|---|---|---|---|---|---|---|---|---|---|---|---|---|---|
| | 0 | 30 | 60 | 90 | 120 | 150 | 180 | 210 | 240 | 270 | 300 | 330 | 360 | 390 | 420 | 450 | 480 | 510 | 540 | 570 | 600 | 630 | 660 | 690 | 720 |
| 4-CYLINDER ENGINE | #1 | | | | | | #3 | | | | | | #4 | | | | | | #2 | | | | | | #1 |
| 6-CYLINDER ENGINE | #1 | | | | #5 | | | | #3 | | | | #6 | | | | #2 | | | | #4 | | | | #1 |
| 8-CYLINDER ENGINE | #1 | | | #4 | | | #7 | | | #3 | | | #8 | | | #5 | | | #2 | | | #6 | | | #1 |

MISFIRE DETECTION DEVICE TO DETECT MISFIRE BASED ON A FREQUENCY ANALYSIS OF A ROTATION SIGNAL CORRELATED WITH A ROTATIONAL STATE OF AN INTERNAL COMBUSTION ENGINE

CROSS REFERENCE TO RELATED APPLICATION

This application is based on Japanese Patent Application No. 2015-242562 filed on Dec. 11, 2015, the disclosure of which is incorporated herein by reference.

TECHNICAL FIELD

The present disclosure relates to a misfire detection device configured to detect misfire caused in an internal combustion engine.

BACKGROUND

A conventional technology is employed to detect misfire caused in an internal combustion engine according to a rotational state of the engine. For example, Patent Document 1 discloses a configuration to perform frequency analysis on a rotation signal, which represents an engine revolution of a four-stroke engine having four cylinders. The configuration detects misfire caused in the engine according to an analysis result of the frequency analysis. The configuration of Patent Document 1 compares a frequency component of an ignition cycle of one of the four cylinders with a frequency component of a transition cycle, at which the four cylinders sequentially moves to its top dead center state in order. The configuration of Patent Document 1 further detects occurrence of misfire in a case where the frequency component of the ignition cycle is greater than the frequency component of the transition cycle and where a difference therebetween is greater than a threshold value. When misfire does not occur in the internal combustion engine, the frequency component of the ignition cycle decreases to be smaller than the frequency component of the transition cycle.

(Patent Documents 1)

Japanese published unexamined application No. H4-19344.

It is noted that, in the configuration to detect misfire according to the magnitude of the frequency component of the ignition cycle, it is concerned that a detection accuracy would decrease in a case where noise arises in the rotation signal. For example, in a vehicle equipped with an internal combustion engine, a disturbance may arise as the vehicle travels. The disturbance is, for example, vibration caused from a road surface, an axle, and/or the like. In a case where such a disturbance is carried as a noise on the rotation signal, the cycle of the noise may coincide with the ignition cycle. When an occurrence cycle of noise coincides with the ignition cycle and when the frequency component of the ignition cycle is greater than the frequency component of the transition cycle, the configuration may detect misfire even though misfire does not occur in the internal combustion engine.

SUMMARY

It is an object of the present disclosure to produce a misfire detection device configured to detect misfire occurring in an internal combustion engine properly with less influence of a disturbance.

According to an aspect of the present disclosure, a misfire detection device comprises a rotation acquisition unit configured to acquire a rotation signal correlated with a rotational state of an internal combustion engine. The misfire detection device further comprises an analysis unit configured to perform frequency analysis of the rotation signal acquired with the rotation acquisition unit. The misfire detection device further comprises an inter-cylinder determination unit configured to determine whether an inter-cylinder component is smaller than an inter-cylinder threshold representing occurrence of misfire. The inter-cylinder component is a frequency component of an inter-cylinder cycle. The inter-cylinder cycle is a value computed by dividing an ignition cycle by a number of cylinders of the internal combustion engine. The ignition cycle is one burning cycle of the internal combustion engine.

BRIEF DESCRIPTION OF THE DRAWINGS

The above and other objects, features and advantages of the present invention will become more apparent from the following detailed description made with reference to the accompanying drawings. In the drawings:

FIG. 2A is a time chart showing a speed signal of an engine when misfire does not occur, FIG. 2B is a time chart showing the speed signal when misfire occurs in only one cylinder, and FIG. 2C is a time chart showing the speed signal carrying a noise;

FIG. 8 is a graph showing an inter-cylinder wave of the angular acceleration signal;

FIGS. 9A to 9D are graphs each showing a frequency analysis result of the angular acceleration signal for each cylinder;

FIG. 19 is a view showing an ignition order in cylinders for various engines.

DETAILED DESCRIPTION

Figure 1:
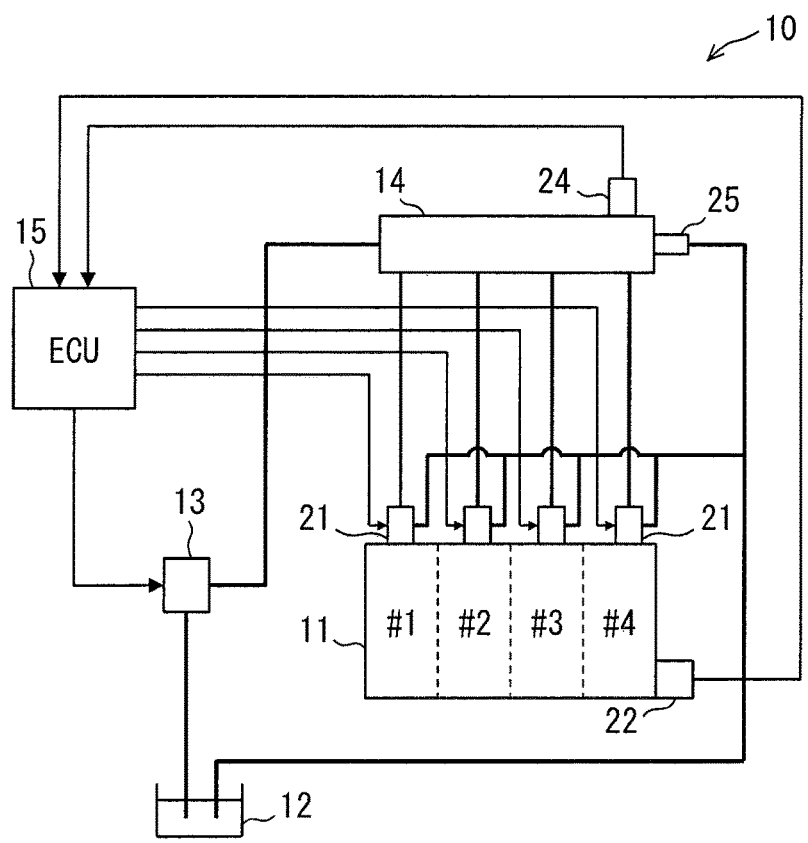
FIG. 1 is a diagram showing a configuration of a fuel injection system according to a first embodiment.

As follows, embodiments of the present disclosure will be described with reference to drawings. The same reference numeral will be denoted to corresponding elements, which are common in different embodiments. In this case, duplex description may be omitted for the corresponding element. In a case where a part of a configuration is described in a subsequent embodiment, the configuration of another preceding embodiment, which is described before, may be applied to a portion of the configuration of the subsequent embodiment. The disclosure is not limited to a combination of configurations, which is clearly shown in the description of an embodiment. If possible, combination of configurations of multiple embodiment may be partially or entirely made, even though the combination is not clearly described.

First Embodiment

As shown in FIG. 1, a fuel injection system 10 includes an internal combustion engine 11, a fuel tank 12, a high-pressure pump 13, a common rail 14, and an ECU 15. The internal combustion engine 11 includes multiple cylinders and fuel injection valves 21, which are equipped to the cylinders, respectively, The internal combustion engine 11 uses, as fuel, gasoline, light diesel oil, and/or the like. In the present embodiment, the engine 11 is a diesel engine, which uses light diesel oil.

The engine 11 of the present embodiment is a 4-cylinder four-stroke engine. In the engine 11, the fuel injection valves 21 repeatedly perform fuel injection in a #1 cylinder (1st cylinder), a #3 cylinder (3rd cylinder), a #4 cylinder (4th cylinder), and a #2 cylinder (2nd cylinder), in this order. In the present configuration, operations are made in the #1 cylinder and the #4 cylinder at the same phase, and operations are made in the #2 cylinder and the #3 cylinder at the same phase. In the configuration shown in FIG. 1, the #1 cylinder to the #4 cylinder are arranged in this order from the left to the right in the drawing.

The engine 11 includes a crank angle sensor 22 to detect a crank angle. The crank angle sensor 22 is mounted on a cylinder block of the engine 11 and is configured to send a detection signal according to a rotation speed of the crankshaft. The rotation speed of the crankshaft may be referred to as a revolution NE, a revolution per unit time, and/or a rotation speed of the engine 11. The engine 11 further includes a cam angle sensor to detect a cam angle. The cam angle sensor is equipped to a cylinder head of the engine 11 to detect the rotation angle of the camshaft on the side of intake air.

The fuel tank 12 stores fuel. The high-pressure pump 13 pressurizes fuel from the fuel tank 12 and supplies the pressurized fuel to the common-rail 14. The common-rail 14 is a pressure-accumulation vessel formed of a metallic tubular component. The common-rail 14 is equipped with a rail pressure sensor 24 and a pressure limiter 25. The rail pressure sensor 24 is a sensor to detect pressure of fuel, which is pressure-accumulated in the common-rail 14, as a rail pressure. The pressure limiter 25 is configured to discharge fuel from the common-rail 14 to the fuel tank 12 thereby to decrease the rail pressure, when the rail pressure increases excessively.

The ECU 15 includes a control unit, such as a microcomputer, and a storage unit, such as a memory device. The ECU 15 is electrically connected with the crank angle sensor 22 and the rail pressure sensor 24. The crank angle sensor 22 and the rail pressure sensor 24 send a detection signals, respectively, to the ECU 15. In addition, the ECU 15 is electrically connected with the high-pressure pump 13. The ECU 15 sends an instruction signal to the high-pressure pump 13 thereby to perform a motion control of the high-pressure pump 13.

The ECU 15 has a function to generate a speed signal, which represents the rotation speed of the crankshaft. The ECU 15 uses the detection signal of the crank angle sensor 22 to generate the speed signal. Each of FIGS. 2A to 2C schematically shows the speed signal. FIG. 2A shows a state in which misfire occurs in none of the cylinders of the engine 11. In FIG. 2A, the speed signal shows the rotation speed of the crankshaft, which properly changes due to combustion of fuel in the #1 to #4 cylinders. Specifically, in FIG. 2A, the rotation speed repeats increase and decrease correspondingly to a time point, at which one of the four cylinders is in a combustion stroke. Therefore, multiple peak components P occur correspondingly to the combustion strokes, respectively. In FIG. 2A, one of the four cylinders, which is in the combustion stroke, is presumed to generate a driving force to drive the crankshaft. Therefore, a number of the corresponding cylinder is denoted on each peak component P.

In the engine 11, a cycle, at which one cylinder generates a driving force, corresponds to an ignition cycle Ta, at which ignition of fuel occurs in the cylinder. Therefore, the ignition cycle Ta has a length, which is the same as the length of one burning cycle. FIG. 2A typically illustrates the ignition cycle Ta on the #2 cylinder. It is noted that, the ignition cycle Ta is the same as the ignition cycle in length at any of the #1 #4 cylinders. The ignition cycle Ta is 720 degrees when represented by a crank angle CA in place of the time period.

In the engine 11, the cycle, at which one of the cylinders generates a driving force, corresponds to an inter-cylinder cycle Tb, which is calculated by dividing the ignition cycle Ta by the number of the cylinders. In FIG. 2A, the inter-cylinder cycle Tb corresponds to an interval between the peak components P, which are adjacent to each other. In the present embodiment, the engine 11 includes four cylinders. Therefore, the inter-cylinder cycle Tb is one fourth of the ignition cycle Ta. Specifically, the inter-cylinder cycle Tb is 180 degrees.

In a case where misfire occurs in the engine 11, the rotation speed of the crankshaft decreases in a time period, in which a cylinder, in which misfire occurs, is expected to be in a combustion stroke. In this case, a maximum value of the peak component P of the cylinder, in which misfire occurs, becomes smaller than a maximum value of the peak component P of the cylinder, in which misfire does not occur. For example, as shown in FIG. 2B, in a case where misfire occurs in only the #4 cylinder, the maximum value of the peak component P of the #4 cylinder becomes smaller than the maximum value of the peak component P of each of the #1 to #3 cylinders. In a case where misfire occurs in only one cylinder, an occurrence cycle Tx of misfire becomes the same as the ignition cycle Ta.

Figure 3:
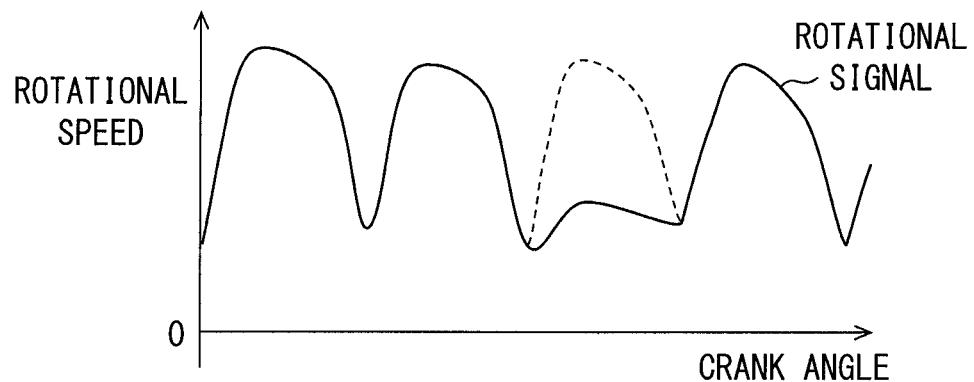
FIG. 3 is a graph showing a speed signal.
Figure 4:
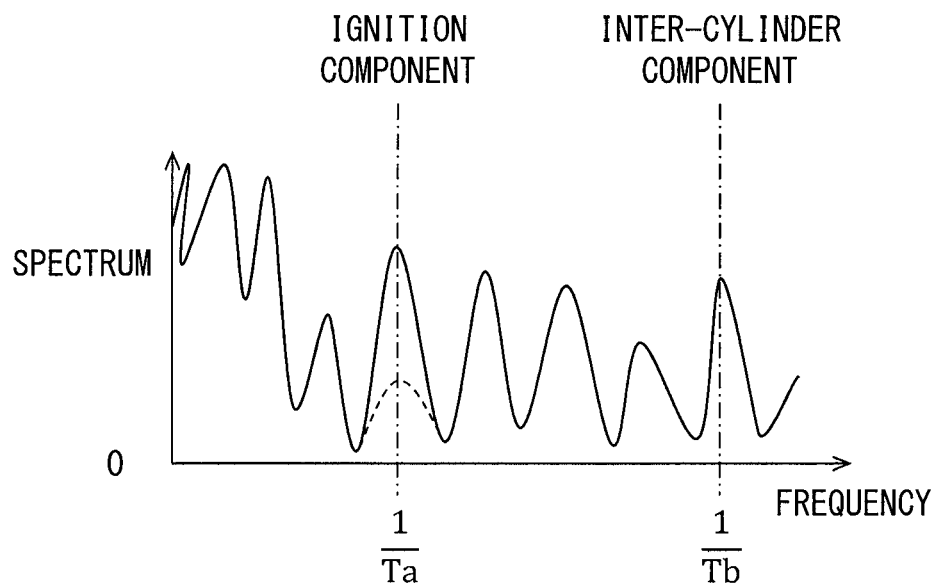
FIG. 4 is a graph showing a frequency analysis result of the speed signal.

Herein, it is conceivable to perform a frequency analysis of the speed signal by employing Fast Fourier Transform (FFT) and/or the like, thereby to enable to determine occurrence of misfire. For example, a case where misfire occurs in only one of the four cylinders is conceived. In this case, as shown in FIG. 3, the speed signal is deformed from a proper waveform. That is, the speed signal is not in a proper waveform. In the present case, a frequency analysis is performed on the speed signal. A solid line in FIG. 4 shows a result of the frequency analysis. According to the solid line in FIG. 4, both an ignition component and an inter-cylinder component become relatively large. The ignition component is a frequency component of the ignition cycle Ta. The inter-cylinder component is a frequency component of the inter-cylinder cycle Tb. It is noted that, the frequency component, the ignition component, and the inter-cylinder component may be referred to as a frequency spectrum, an ignition spectrum, and an inter-cylinder spectrum, respectively.

To the contrary, a dashed line in FIG. 4 shows a result of the frequency analysis performed on the speed signal in a case where misfire occurs in none of the four cylinders. In the present case, as shown by the dashed line in FIG. 4, the ignition component clearly becomes smaller compared with the inter-cylinder component. The present result arises for the following reason. Specifically, in a case where combustion is made properly in all the cylinders, change in the rotation speed, which is due to occurrence of misfire, does not occur at the ignition cycle Ta.

Figure 5:
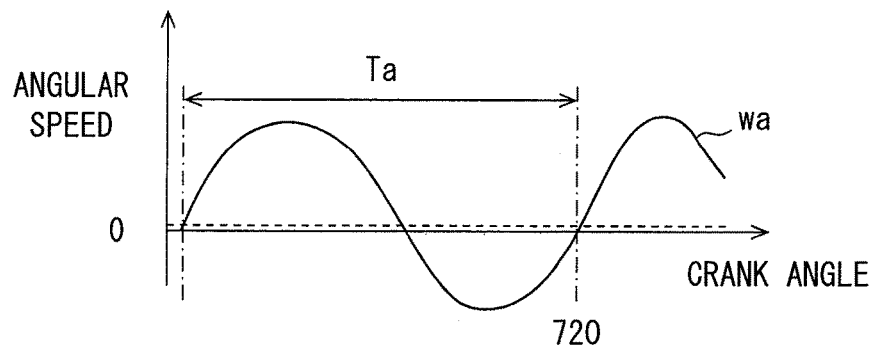
FIG. 5 is a graph showing an ignition wave of an angular acceleration signal.

Herein, the configuration enables to generate an angular acceleration signal by using the speed signal. The angular acceleration signal represents an angular acceleration of the crankshaft. In the present configuration, the speed signal and the angular acceleration signal may be equivalent to a rotation signal, which represents a rotational state of the engine 11. The speed signal includes a large number of frequency components. In consideration of this, the present configuration employs a band filter, which uses the speed signal to enable to pass information selectively in a specific frequency band. Thus, the present configuration enables to acquire the angular acceleration signal at a specific cycle. The present configuration extracts an ignition wave wa of the ignition cycle Ta from the angular acceleration signal. As shown by a solid line in FIG. 5, in a case where misfire occurs in only one cylinder, the ignition wave wa of the angular acceleration signal increases and decreases at the ignition cycle Ta. To the contrary, as shown by a dashed line in FIG. 5, in a case where misfire occurs in none of the four cylinders, the ignition wave wa of the angular acceleration signal neither increase nor decrease at the ignition cycle Ta. That is, in this case, the ignition wave wa is substantially constant at zero. In the present state, the angular acceleration at the ignition cycle Ta does not arise, because misfire does not occur.

Figure 6:
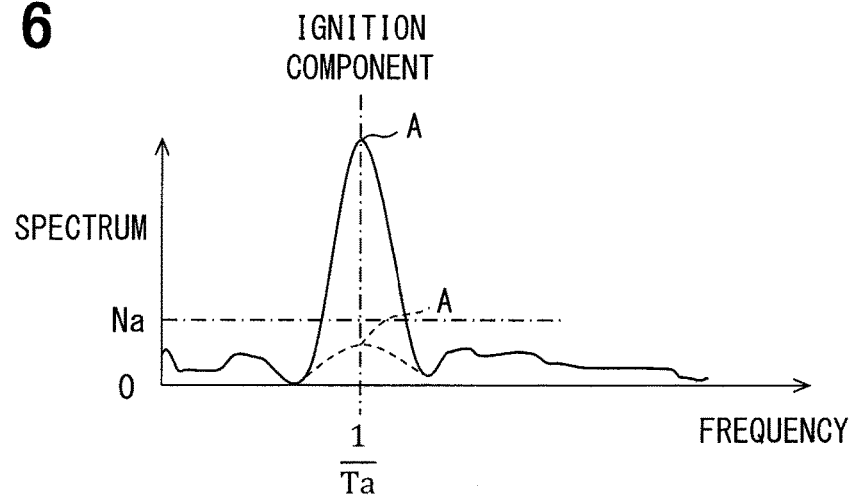
FIG. 6 is a graph showing a frequency analysis result of the angular acceleration signal.

A solid line in FIG. 6 shows a result of a frequency analysis of the angular acceleration signal using FFT and/or the like. In a case where misfire occurs in only one cylinder, as shown by the solid line in FIG. 6, the ignition component of the ignition cycle Ta becomes extremely greater than other frequency components. The present analysis result shows that the ignition wave wa of the angular acceleration signal increases and decreases at the ignition cycle Ta. A dashed line in FIG. 6 shows a result of a frequency analysis of an angular acceleration signal performed in a case where misfire occurs in none of the four cylinders. Contrary to the previous case, as shown by the dashed line in FIG. 6, the ignition component of the ignition cycle Ta becomes smaller than the ignition component of the ignition cycle in the case where misfire occurs in only one cylinder.

Figure 7:
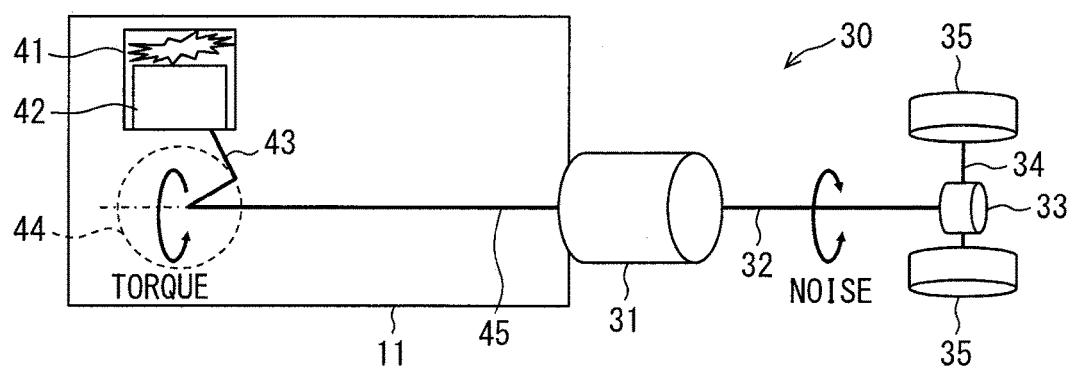
FIG. 7 is a schematic diagram showing a configuration of a vehicle.

According to the present embodiment, the engine 11 is equipped in a vehicle 30. As shown in FIG. 7, the vehicle 30 includes a transmission device 31, a propeller shaft 32, a differential gear 33, a drive shaft 34, and wheels 35. In addition, the engine 11 has the cylinders 41 and includes pistons 42, connecting rods 43, and the crankshaft 44. The cylinder 41 is equipped with the piston 42 and the connecting rod 43 individually in each of the cylinders. In the engine 11, the crankshaft 44 is connected to the transmission device 31 through an input shaft 45. The crankshaft 44 has a crank axis. In the engine 11, the fuel injection valve 21 injects fuel into the cylinder 41, and the injected is burned in the cylinder 41. A rotational torque is generated in this way and applied to the crankshaft 44. Thus, the crank axis is rotated at a speed according to the applied rotational torque.

As the vehicle 30 travels, a disturbance, such as oscillation, may be applied from a road surface or from the drive shaft 34. The applied disturbance may be transmitted as a noise to the propeller shaft 32. In this state, the noise may be contained in rotation information on the crank axis. As shown in FIG. 2C, in such a case where the noise is contained in the speed signal, the speed signal shows the rotation speed, which increases and decrease momentarily. In addition, in a case where noise occurs at a constant interval, a noise cycle Ty, which is an occurrence cycle of noise, may coincide with the ignition cycle Ta.

During investigation, inventors acquired a significant knowledge. Specifically, an analysis result of the frequency analysis on the speed signal and the angular acceleration signal, in a case where the noise cycle Ty coincides with the ignition cycle Ta, becomes substantially the same as an analysis result in a case where misfire occurs in only one cylinder. According to the inventor's knowledge, similarly to the solid line in FIG. 4, the analysis result of the speed signal shows that both the ignition component and the inter-cylinder component become relatively large. In this case, similarly to the solid line in FIG. 6, the analysis result of the angular acceleration signal shows that the ignition component of the angular acceleration signal becomes relatively large. Therefore, in a case where only the ignition component, such as the speed signal, is used as a determination parameter of occurrence of misfire, determination becomes difficult to discriminate between actual occurrence of misfire and occurrence of noise in the speed signal. Therefore, it is concerned to make an erroneous determination of occurrence of misfire even though actual misfire does not occur.

In addition, as shown in FIG. 8, the inventors further acquired a significant knowledge during the investigation. Specifically, in a case where the inter-cylinder wave wb at the inter-cylinder cycle Tb is extracted from the angular acceleration signal, an amplitude of the inter-cylinder wave wb of a cylinder, in which misfire occurs, is different from an amplitude of the inter-cylinder wave wb of a cylinder, in which misfire does not occur. The present knowledge represents that the frequency analysis of the angular acceleration signal shows the different results between a cylinder, in which misfire occurs, and a cylinder, in which misfire does not occur.

The inter-cylinder wave wb contains waveform portions corresponding to the #1 cylinder to the #4 cylinder, respectively. Each of the waveform portions increases and decreases at the inter-cylinder cycle Tb. The waveform portions are arranged in series in the order of fuel injection performed by the #1 cylinder to the #4 cylinder.

In a case where misfire occurs in only one cylinder, the amplitude of the inter-cylinder wave wb of the cylinder, in which misfire occurs, becomes smaller than the amplitude of the inter-cylinder wave wb of the cylinder, in which misfire does not occur. The present tendency represents that a torque, which accelerates rotation of the crank axis in a combustion stroke, becomes insufficient in the cylinder, in which misfire occurs. For example, as shown by the solid line in FIG. 8, in a case where misfire occurs in only the #4 cylinder, the amplitude becomes small in only the #4 cylinder. To the contrary, as shown by the dashed line in FIG. 8, in a case where misfire occurs in none of the four cylinders, the amplitude becomes constant in the #1 cylinder to the #4 cylinder. The present tendency represents that change in the angular acceleration becomes substantially the same among the #1 cylinder to the #4 cylinder, since misfire does not occur.

Frequency analysis of the angular acceleration signal is performed by using FFT and/or the like in a case where misfire occurs in only one cylinder. The present analysis result shows that the inter-cylinder component at the inter-cylinder cycle Tb on the cylinder, in which misfire occurs, becomes smaller than the inter-cylinder component on the cylinder, in which misfire does not occur. As shown in FIGS. 9A to 9D, for example, in a case where misfire occurs in only the #4 cylinder, the inter-cylinder component of the #4 cylinder becomes smaller than the inter-cylinder components of the #1 cylinder to the #3 cylinder.

To the contrary, in a case where misfire occurs in none of the four cylinders, the inter-cylinder components are substantially constant among the #1 cylinder to the #4 cylinder. Herein, as shown in FIGS. 2A to 2C, even in a case where noise is contained in the speed signal at the ignition cycle Ta, the noise does not exert effect on the component of the inter-cylinder cycle Tb. In addition, even in a case where noise is contained in the inter-cylinder cycle Tb, the inter-cylinder component of the cylinder, in which misfire does not occur, hardly decreases to approach the inter-cylinder component of the cylinder, in which misfire occurs. Therefore, the analysis result in a case where misfire does not occur, clearly differs from the analysis result in a case where misfire occurs.

A frequency-analysis result of the angular acceleration signal may be acquired individually for each of the cylinders. In this case, a band filter, which enables to pass only information in a specific band, may be employed to acquire the inter-cylinder component in a crank angle region, which corresponds to each of the cylinders, individually by using the speed signal.

Figure 10:
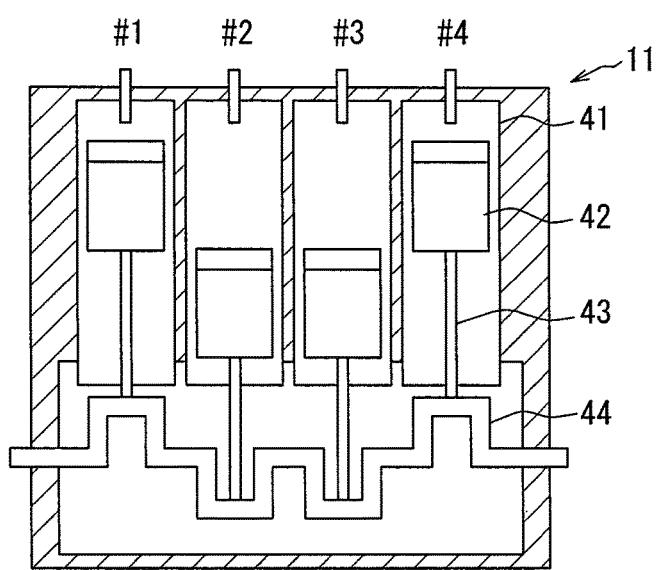
FIG. 10 is a schematic diagram showing paired cylinders in the engine.
Figure 11:
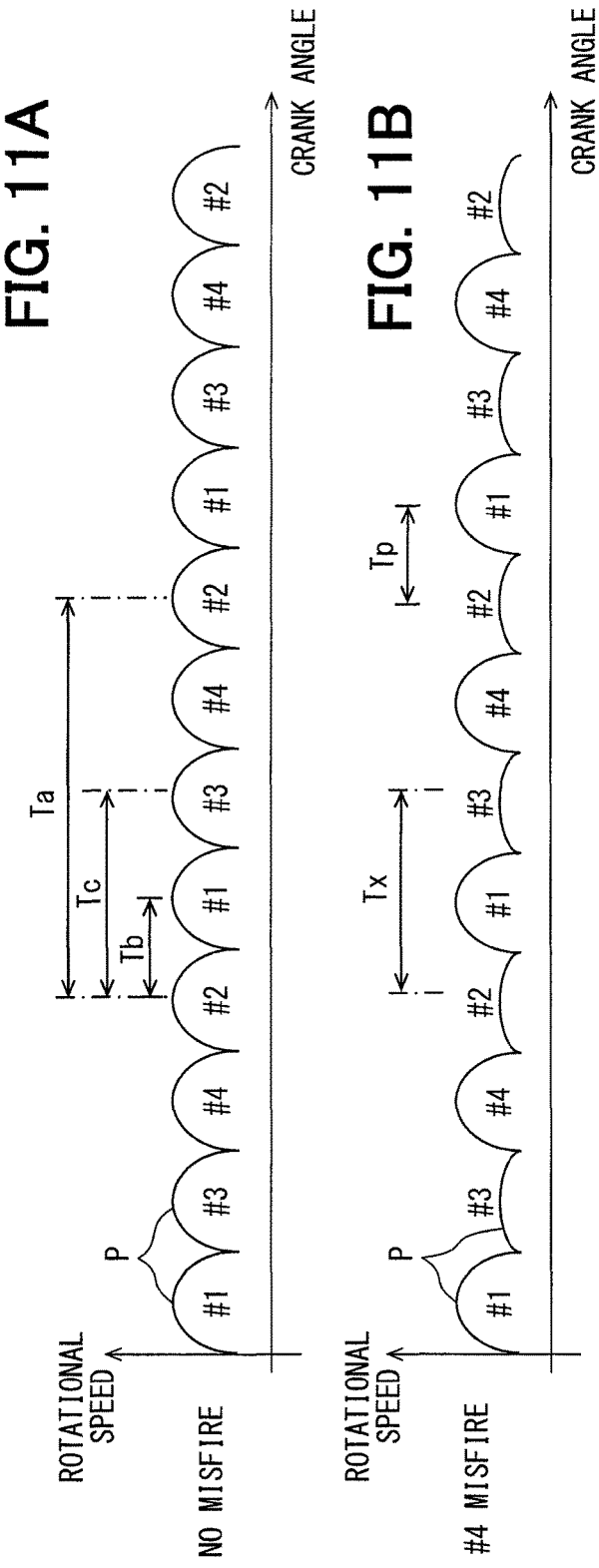
FIG. 11A is a time chart showing the speed signal of the engine when misfire does not occur.
FIG. 11B is a time chart showing the speed signal when misfire occurs in a pair of paired cylinders.
FIG. 11C is a time chart showing the speed signal carrying noise.

In the engine 11, misfire does not necessarily occur in only one cylinder. That is, misfire may occur in two cylinders. The #1 cylinder to the #4 cylinder include paired cylinders including pistons, which are moved at the same phase. As shown in FIG. 10, according to the present embodiment, the #1 cylinder and the #4 cylinder form one pair of paired cylinders, and the #2 cylinder and the #3 cylinder form another pair of paired cylinders. In this case, as shown in FIG. 11A, one of the paired cylinders generates a driving force at an paired cycle Tc, which is ½ of the ignition cycle Ta. The paired cycle Tc is as twice as the inter-cylinder cycle Tb.

Figure 12:
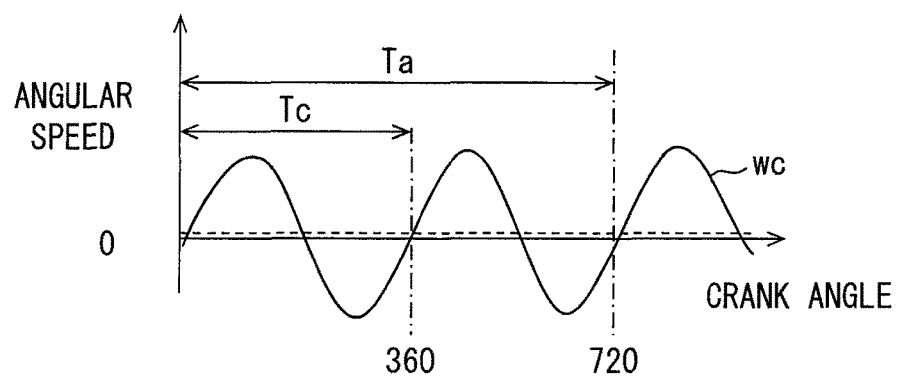
FIG. 12 is a graph showing an ignition wave of the angular acceleration signal.
Figure 13:
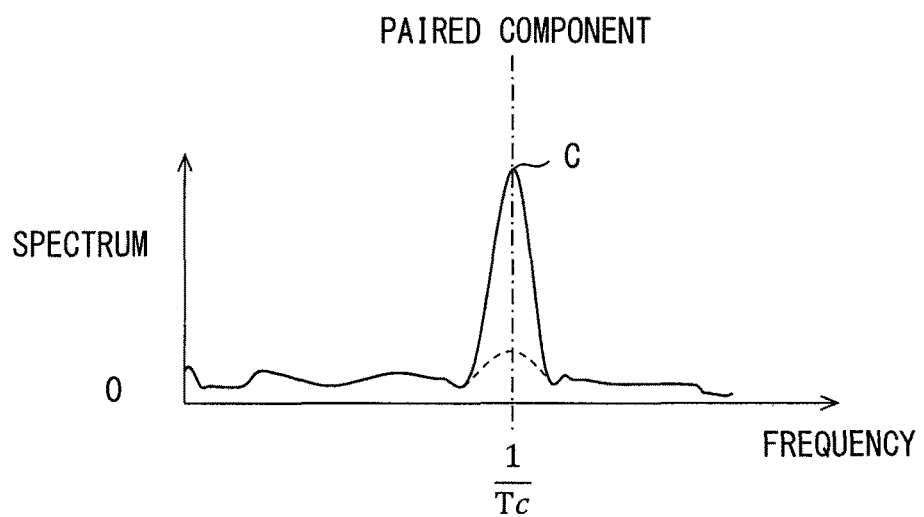
FIG. 13 is a graph showing a frequency analysis result of the angular acceleration signal.

When misfire occurs in both a pair of paired cylinders, an occurrence cycle Tx of misfire becomes the same as the paired cycle Tc. FIG. 11B shows the speed signal when misfire occurs in both the #2 cylinder and the #3 cylinder. It is noted that, in addition to the ignition wave wa, an paired wave wc of the paired cycle Tc can be also extracted from the angular acceleration signal. As shown by a solid line in FIG. 12, in a case where misfire occurs in a pair of paired cylinders, the paired cycle Tc fluctuates at the paired wave wc. FIG. 13 shows a frequency analysis result of the angular acceleration signal by using a FFT and/or the like. A solid line in FIG. 13 shows an paired component, which is a frequency component of the paired cycle. As shown by the solid line in FIG. 13, the paired component is extremely greater than other frequency components. The paired component may be referred to as an paired spectrum.

FIG. 11C shows the speed signal carrying a noise caused by disturbance and/or the like. As shown in FIG. 11C, in a case where the speed signal carries a noise, the noise cycle Ty may coincide with the paired cycle Tc, similarly to the ignition cycle Ta. When the noise cycle Ty coincides with the paired cycle Tc, the analysis result of the frequency analysis of the speed signal and the angular acceleration signal may become substantially the same as the analysis result when misfire occurs in both of the paired cylinders. Consequently, it is concerned about determination that misfire occurs, even though misfire does not occur in the paired cylinders.

Figure 14:
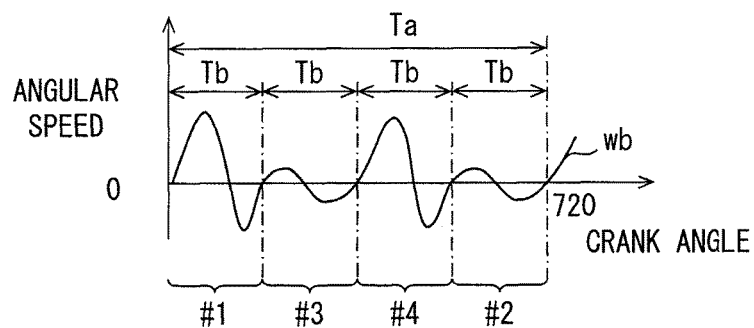
FIG. 14 is a graph showing an inter-cylinder wave of the angular acceleration signal.
Figure 15A:
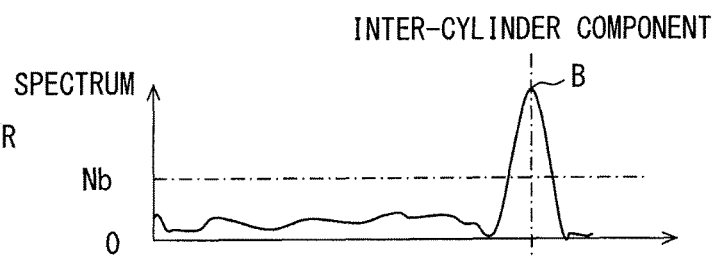
FIGS. 15A to 15D are graphs each showing a frequency analysis result of the angular acceleration signal for each cylinder.
Figure 15B:
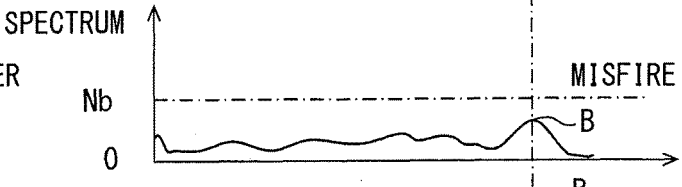
Figure 15C:
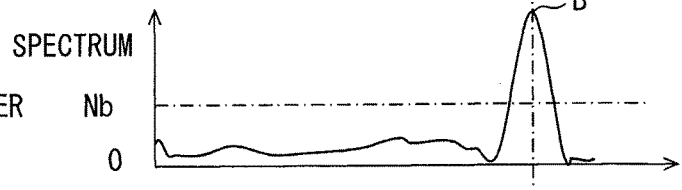
Figure 15D:
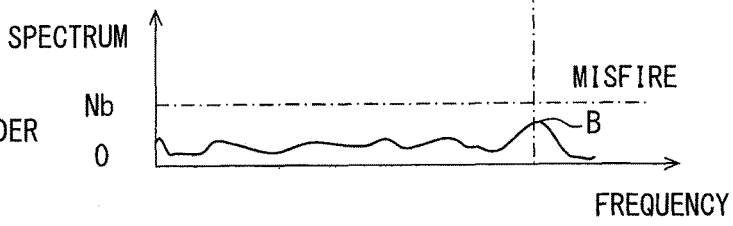

Similarly to the case where misfire occurs in only one cylinder, even when misfire occurs in a pair of paired cylinders, the amplitude of the cylinder, in which misfire occurs, becomes smaller than the amplitude of the cylinder, in which misfire does not occur, in the waveform of the inter-cylinder component of the angular acceleration signal. As shown in FIG. 14, for example, when misfire occurs in both the #2 cylinder and the #3 cylinder, the amplitude of each of the #2 cylinder and the #3 cylinder becomes smaller than the amplitude of each of the #1 cylinder and the #4 cylinder.

Similarly to the case where misfire occurs in only one cylinder, a frequency analysis result of the angular acceleration signal shows that the inter-cylinder component of the pair of the paired cylinders, in which misfire occurs, becomes smaller than the inter-cylinder component, in which misfire occur does not occur, even when misfire occurs in a pair of paired cylinders. As shown in FIGS. 15A to 15D, for example, when misfire occur in both the #2 cylinder and the #3 cylinder, the inter-cylinder component of each of the #2 cylinder and the #3 cylinder becomes smaller than the inter-cylinder component of each of the #1 cylinder and the #4 cylinder.

The ECU 15 executes a misfire detection processing to detect misfire in the engine 11 by utilizing the tendency that the frequency-analysis results of the speed signal and the angular acceleration signal differ between the cylinder in which misfire occurs and the cylinder in which misfire does not occur. The misfire detection processing will be described with reference to FIG. 16. The processing is repeatedly executed at a predetermined cycle during a period in which the engine 11 is in operation. The ECU 15 has a function to execute each step of the misfire detection processing. The ECU 15 may be equivalent to a misfire detection device.

Figure 16:
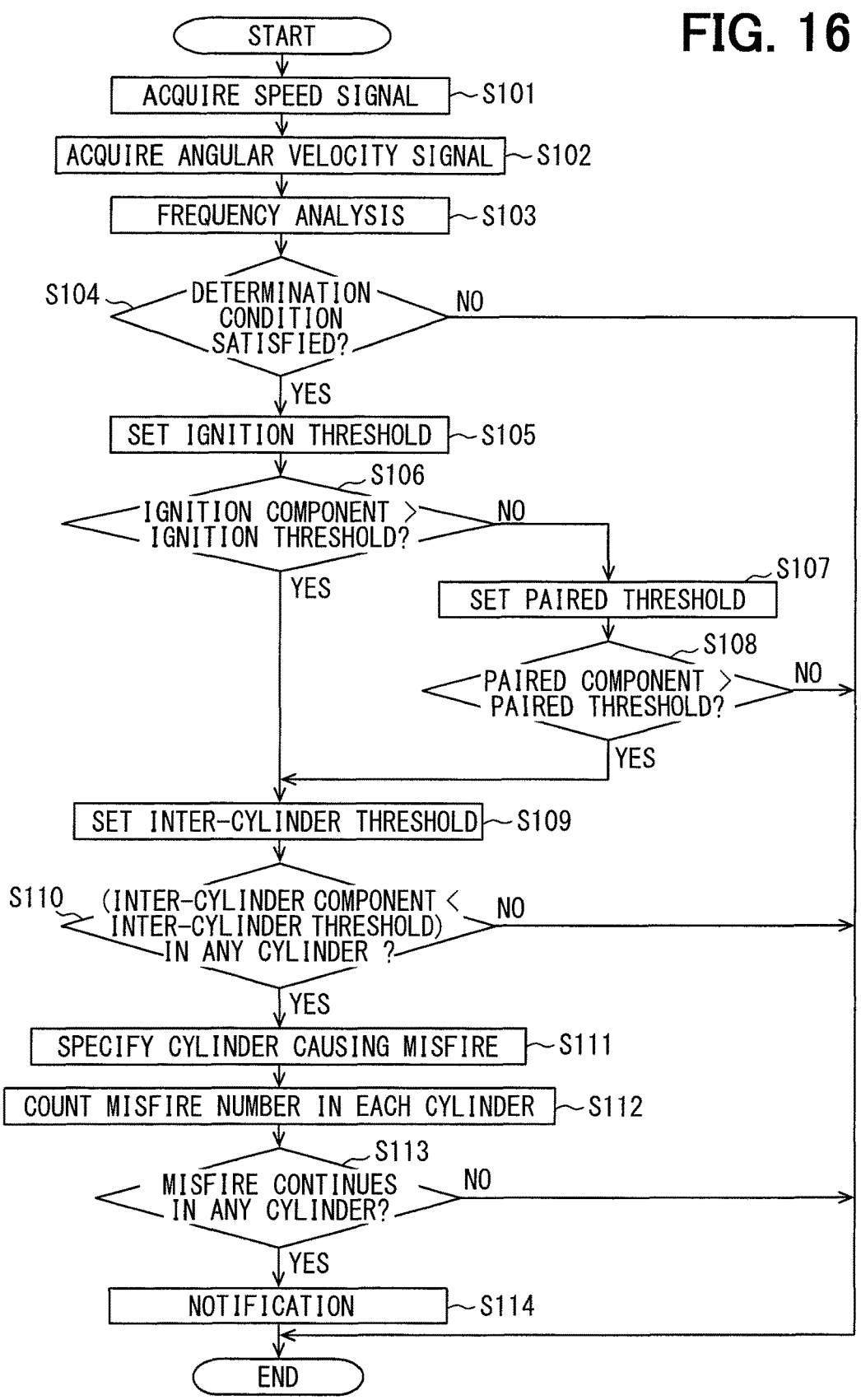
FIG. 16 is a flowchart showing a procedure of a misfire detection processing.

In FIG. 16, at step S101, the ECU 15 generates the speed signal according to the detection signal of the crank angle sensor 22. At step S102, the ECU 15 generates the angular acceleration signal according to the speed signal. At step S103, the ECU 15 performs a frequency analysis of the angular acceleration signal by using FFT and/or the like. Step S101 may be equivalent to a rotation acquisition unit. Step S102 may be equivalent to a rotation acquisition unit and an acceleration acquisition unit. Step S103 may be equivalent to an analysis unit.

At step S104, the ECU 15 determines whether a determination condition for performing a misfire determination is satisfied. Specifically, the ECU 15 executes determination whether the rotation speed and an output torque of the engine 11 are in a stable state, determination whether shift change is being performed, and/or the like. For example, the determination condition is satisfied when the rotation speed and the output torque of the engine 11 are in a stable state and when shift change is not being performed. When the determination condition is satisfied, the processing proceeds to step S105. The ECU 15 may further perform determination whether the engine 11 is in an engine stall state, determination whether a fail-safe processing is executed to terminate fuel combustion in at least one cylinder, and/or the like. When a negative result is made in each of the determinations, the ECU 15 determines that the determination condition is satisfied. In this case, the processing proceeds to step S105.

At step S105, an ignition threshold is set for determining whether misfire occurs in only one cylinder. In this processing, the ignition threshold is set according to an operation state of the engine 11, such as the rotation speed and/or the output torque. For example, the memory device stores a data map, which defines a relationship among the revolution of the engine, the output torque of the engine, the amplitude of the ignition wave wa, and the magnitude of the ignition component, when misfire occurs and/or when misfire does not occur. The ECU 15 sets the ignition threshold with reference to the data map and/or the like. More specifically, the ECU 15 sets the ignition threshold at a smaller value, as the rotation speed becomes higher, and/or as the output torque becomes smaller. The present setting is made in consideration of that the amplitude of the frequency and the magnitude of the component become smaller, as the rotation speed becomes higher and/or as the output torque becomes smaller.

At step S106, the ECU 15 determines whether the ignition component is greater than the ignition threshold for determining whether misfire occurs in only one cylinder. Step S106 may be equivalent to an ignition determination unit.

For example, as shown by a solid line in FIG. 6, when the ignition component A is greater than the ignition threshold Na at the ignition cycle Ta, there is a high possibility that misfire occurs only in one cylinder. In this case, the processing proceeds to step S109. At step S109, an inter-cylinder threshold is set for determining whether misfire occurs in a cylinder. In this processing, the inter-cylinder threshold is set according to an operation state of the engine 11, such as the rotation speed and/or the output torque. For example, the memory device stores a data map, which defines a relationship among the revolution of the engine, the output torque of the engine, the amplitude of the inter-cylinder wave wb, and the magnitude of the inter-cylinder component, when misfire occurs and/or when misfire does not occur. The ECU 15 sets the inter-cylinder threshold with reference to the data map and/or the like. More specifically, the ECU 15 sets the inter-cylinder threshold at a smaller value, as the rotation speed becomes higher, and/or as the output torque becomes smaller. The present setting is made in consideration of that the amplitude of the frequency and the magnitude of the component become smaller, as the rotation speed becomes higher and/or as the output torque becomes smaller. In the present example, the inter-cylinder threshold is set at the same value for each cylinder. Step S109 may be equivalent to a threshold setting unit.

At step S110, the ECU 15 determines whether the inter-cylinder component is smaller than the inter-cylinder threshold individually for each cylinder. The ECU 15 determines whether a cylinder, in which the inter-cylinder component is smaller than the inter-cylinder threshold, exists, according to a result of the determination. Step S110 may be equivalent to an inter-cylinder determination unit.

When a cylinder, in which the inter-cylinder component is smaller than the inter-cylinder threshold, exists, the processing proceeds to step S111. At step S111, the ECU 15 specifies the cylinder, in which misfire occurs. In this processing, the ECU 15 determines the number of the cylinder, in which the inter-cylinder component is smaller than the inter-cylinder threshold, in order to confirm that the number of the cylinder, in which misfire occurs, is one. When the number is confirmed to be one, the ECU 15 specifies the cylinder, in which the inter-cylinder component is smaller than the inter-cylinder threshold, as the cylinder, in which misfire occurs. For example, as shown in FIGS. 9A to 9D, a cylinder, in which the inter-cylinder component B is smaller than the inter-cylinder threshold Nb, is only the #4 cylinder. In this case, the ECU 15 specifies that the #4 cylinder is the cylinder, in which misfire occurs.

At step S112, the ECU 15 counts a number of misfire, which occurs in each cylinder, in a predetermined number of injections. The predetermined number of injections is set at about, for example, 2000. The present example supposes a 4-cylinder engine, which rotates for 1000 times with 2000 injections. At step S113, the ECU 15 determines whether a cylinder, which is in a misfire continuing state, exists. When a cylinder continues to cause misfire, the cylinder is in the misfire continuing state. More specifically, in the present example, the ECU 15 determines whether a number of misfire in a predetermined injections is greater than a predetermined determination threshold for each cylinder. When a cylinder, in which the number of misfire is greater than the number of predetermined determination threshold, exists, the ECU 15 determines that the cylinder is in the misfire continuing state. When a cylinder in the misfire continuing state exists, the processing proceeds to step S114.

At step S114, the ECU 15 performs a notification processing. Specifically, the vehicle is equipped with a malfunction diagnosis device having a self-diagnostic function. In the present notification processing, the ECU 15 sends a notification signal to an ECU of the malfunction diagnosis device. The notification signal represents that a cylinder in the misfire continuing state exists. On receiving the notification signal, the ECU of the malfunction diagnosis device performs a processing to cause a display device of an instrument panel to indicate occurrence of misfire and/or to perform a processing to activate a malfunction warning light MIL.

At step S106, for example, as shown by the dashed line in FIG. 6, when the ignition component A is smaller than the ignition threshold Na at the ignition cycle Ta, the ECU 15 determines that misfire occurs in none of the cylinders or determines that misfire occurs in a pair of paired cylinders. In this case, the processing proceeds to step S107. At step S107, an paired threshold is set for determining whether misfire occurs in a pair of paired cylinders. In this processing, the paired threshold is set according to an operation state of the engine 11, such as the rotation speed and/or the output torque, similarly to the ignition threshold. For example, the memory device stores a data map, which defines a relationship among the revolution of the engine, the output torque of the engine, the amplitude of an paired wave wc, and the magnitude of the inter-cylinder component, when misfire occurs and/or when misfire does not occur. The ECU 15 sets the paired threshold with reference to the data map and/or the like. More specifically, the ECU 15 sets the paired threshold at a smaller value, as the rotation speed becomes higher, and/or as the output torque becomes smaller.

At step S108, the ECU 15 determines whether the paired component is greater than the paired threshold. Step S108 may be equivalent to an paired determination unit.

For example, as shown by a solid line in FIG. 13, when the paired component C is greater than the paired threshold Nc at the paired cycle Tc, the ECU 15 determines that a possibility that misfire occurs in a pair of paired cylinders is high. In this case, the processing proceeds to steps S109 and S110 similarly to the case where step S106 makes a positive determination. Subsequently, at step S111, the ECU 15 determines the number of the cylinders, in which the inter-cylinder component is smaller than the inter-cylinder threshold, in order to confirm that the cylinders, in which misfire occurs, are a pair of paired cylinders. When the number is confirmed to be two, the ECU 15 specifies the cylinders, in which the inter-cylinder component is smaller than the inter-cylinder threshold, as the cylinders, in which misfire occurs. For example, as shown in FIGS. 15A to 15D, when the inter-cylinder component B is smaller than the inter-cylinder threshold Nb in both the #2 cylinder and the #3 cylinder and when the #2 cylinder and the #3 cylinder are a pair of paired cylinders, the ECU 15 specifies the #2 cylinder and the #3 cylinder as the cylinders in which misfire occurs.

Subsequently, at steps S112 to S115, the ECU 15 performs processings similarly to the case where misfire occurs in only one cylinder at step S106.

As follows, operation effect of the first embodiment will be described.

In the first embodiment, when the inter-cylinder component is smaller than the inter-cylinder threshold according to the frequency-analysis result of the angular acceleration signal, determination is made that misfire occurs. Therefore, even in a case where the inter-cylinder component becomes large due to noise, the present configuration avoids wrong determination of occurrence of misfire when misfire actually does not occur. Therefore, the present configuration enables proper detection of occurrence of misfire in the engine 11 regardless of disturbance.

The first embodiment makes determination whether the inter-cylinder component is smaller than the inter-cylinder threshold individually for each cylinder. Therefore, the present configuration enables to detect that the amplitude of the inter-cylinder wave wb of the angular acceleration signal in the cylinder, in which misfire occurs, is smaller than the amplitude in the cylinder, in which misfire occurs. Therefore, the present configuration steadily enables to detect that misfire occurs in only one cylinder among four cylinders and that misfire occurs in a pair of cylinders. That is, the present configuration enables to enhance accuracy of detection of misfire. To the contrary, for example, an assumable configuration may be employed to perform the frequency analysis of the angular acceleration signal on the cylinders altogether. It is noted that, the assumable configuration may hardly reflect the phenomenon that the amplitude of the inter-cylinder wave wb in a cylinder, in which misfire occurs, is different from the amplitude in a cylinder, in which misfire does not occur, on the magnitude of the inter-cylinder component. Therefore, even when the assumable configuration, which performs the frequency analysis of the angular acceleration signal on the cylinders altogether, is employed to determine whether the inter-cylinder component is smaller than the inter-cylinder threshold, the assumable configuration may hardly detect misfire with sufficient accuracy.

The first embodiment performs variable setting of the inter-cylinder threshold according to the operation state of the engine 11. In this way, the present configuration may enable to maintain the determination accuracy of the misfire with reference to the inter-cylinder threshold when misfire occurs, even if the amplitude of the speed signal, the angular acceleration signal, or the like varies in dependence upon the operation state of the engine 11.

The first embodiment makes determination that misfire occurs in only one cylinder only in a condition where both the conditions are satisfied that the inter-cylinder component is smaller than the inter-cylinder threshold, and the ignition component is greater than the ignition threshold. In this way, the present configuration enables to avoid erroneous determination that misfire occurs in only one cylinder in a condition where misfire does not occur or where misfire occurs in two or more cylinders. That is, the present configuration enables to enhance the detection accuracy that misfire occurs in only one cylinder.

The first embodiment makes determination that misfire occurs in a pair of cylinders only in a condition where both the conditions are satisfied that the inter-cylinder component is smaller than the inter-cylinder threshold, and the paired component is greater than the paired threshold. In this way, the present configuration enables to avoid erroneous determination that misfire occurs in a pair of cylinders in a condition where misfire does not occur or where misfire occurs in only one cylinder. That is, the present configuration enables to enhance the detection accuracy that misfire occurs in a pair of cylinders.

Second Embodiment

In the first embodiment, a 4-cylinder engine is exemplified as the engine 11. In the second embodiment, a 6-cylinder engine or an 8-cylinder engine is exemplified as the engine 11. The present second embodiment will be described mainly on difference from the first embodiment.

Figure 17:
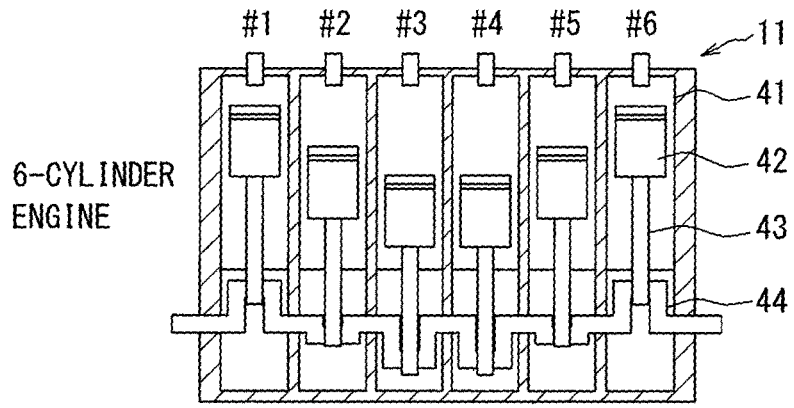
FIG. 17 is a schematic diagram showing a configuration of a six-cylinder engine.

As shown in FIG. 17, the 6-cylinder engine includes #1 cylinder to #6 cylinder. In the 6-cylinder engine, a #1 cylinder and a #6 cylinder form a pair of paired cylinders, a #2 cylinder and a #5 cylinder form a pair of paired cylinders, and a #3 cylinder and a #4 cylinder form a pair of paired cylinders. An ignition cycle and an paired cycle of a 6-cylinder engine are the same as those of the 4-cylinder engine of the first embodiment. An inter-cylinder cycle of a 6-cylinder engine is one sixth of an ignition cycle, dissimilarly to that of a 4-cylinder engine. Specifically, in a 6-cylinder engine, the ignition cycle is 720 degrees, the inter-cylinder cycle is 120 degrees, and the paired cycle is 360 degrees.

As shown in FIG. 19, a 6-cylinder engine performs injection and ignition repeatedly in order of a #1 cylinder, a #5 cylinder, a #3 cylinder, a #6 cylinder, a #2 cylinder, to a #4 cylinder. FIG. 19 shows an ignition order of the 4-cylinder engine of the first embodiment, in addition to an ignition order of an 8-cylinder engine. The ignition order of an 8-cylinder engine will be described later.

The inter-cylinder wave wb of a 6-cylinder engine includes waveform portions corresponding to the #1 cylinder to the #6 cylinder. The waveform portions are in series in an order in which the #1 cylinder to the #6 cylinder perform fuel injection. Similarly to the first embodiment, in a case where misfire occurs in only one cylinder or where misfire occurs in a pair of paired cylinders, the amplitude of the inter-cylinder wave wb of a cylinder, in which misfire occurs, becomes smaller than the amplitude of the inter-cylinder wave wb of a cylinder, in which misfire does not occur. A result of frequency analysis of the angular acceleration signal shows that the inter-cylinder component of a cylinder, in which misfire occurs, becomes smaller than the inter-cylinder component of a cylinder, in which misfire does not occur.

Figure 18:
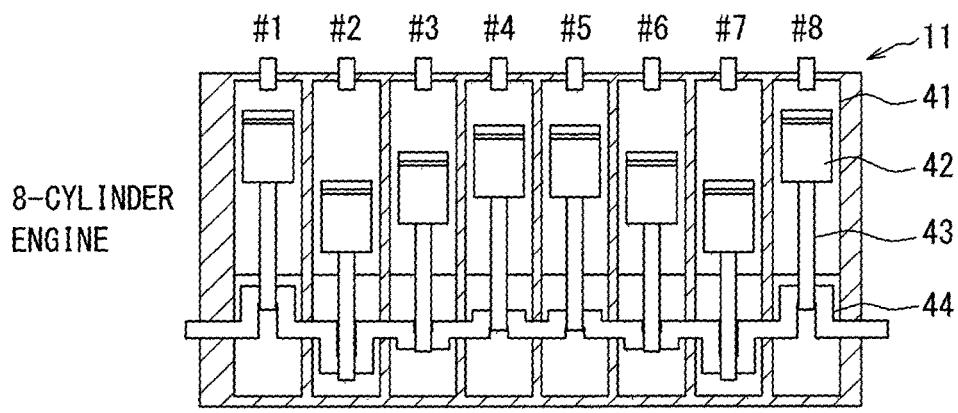
FIG. 18 is a schematic diagram showing a configuration of a eight-cylinder engine.

As shown in FIG. 18, in the 8-cylinder engine including #1 cylinder to #8 cylinder, a #1 cylinder and a #8 cylinder form a pair of paired cylinders, a #2 cylinder and a #7 cylinder form a pair of paired cylinders, a #3 cylinder and a #6 cylinder form a pair of paired cylinders, and a #4 cylinder and a #5 cylinder form a pair of paired cylinders. An ignition cycle and an paired cycle of an 8-cylinder engine are the same as those of the 4-cylinder engine of the first embodiment. An inter-cylinder cycle of an 8-cylinder engine is one eighth of an ignition cycle, dissimilarly to that of a 4-cylinder engine and a 6-cylinder engine. Specifically, in a 8-cylinder engine, the ignition cycle is 720 degrees, the inter-cylinder cycle is 90 degrees, and the paired cycle is 360 degrees. As shown in FIG. 19, an 8-cylinder engine performs injection and ignition repeatedly in order of a #1 cylinder, a #4 cylinder, a #7 cylinder, a #3 cylinder, a #8 cylinder, a #5 cylinder, a #2 cylinder, to a #6 cylinder.

The inter-cylinder wave wb of an 8-cylinder engine includes waveform portions corresponding to the #1 cylinder to the #8 cylinder. The waveform portions are in series in an order in which the #1 cylinder to the #8 cylinder perform fuel injection. Similarly to the first embodiment, in a case where misfire occurs in only one cylinder or where misfire occurs in a pair of paired cylinders, the amplitude of the inter-cylinder wave wb of a cylinder, in which misfire occurs, becomes smaller than the amplitude of the inter-cylinder wave wb of a cylinder, in which misfire does not occur. A result of frequency analysis of the angular acceleration signal shows that the inter-cylinder component of a cylinder, in which misfire occurs, becomes smaller than the inter-cylinder component of a cylinder, in which misfire does not occur.

As described above, also in a 6-cylinder engine and an 8-cylinder engine, in a case where misfire occurs in only one cylinder, an ignition component becomes greater than an ignition threshold, and an inter-cylinder component becomes smaller than the inter-cylinder threshold. In addition, in a case where misfire occurs in a pair of cylinders, the paired component becomes greater than the paired threshold, and the inter-cylinder component becomes smaller than the inter-cylinder threshold. Therefore, also in a 6-cylinder engine or an 8-cylinder engine, detection of misfire is enabled by performing the misfire detection processing in FIG. 16 of the first embodiment.

Other Embodiment

The present disclosure is not limited to the above-described multiple embodiments. The present disclosure may be applicable to various embodiments and combination thereof.

Generation of the angular acceleration signal is not limited according to a speed signal. As a first modification, the angular acceleration signal may be generated directly according to a detection signal of the crank angle sensor 22.

As a second modification, an object signal of the frequency analysis for acquiring the inter-cylinder component is not limited to the angular acceleration signal. The object signal may be, for example, a speed signal, an acceleration signal, which represents acceleration of the engine 11, a detection signal of the crank angle sensor 22, a detection signal of a combustion pressure sensor, and or the like. The combustion pressure sensor detects, as a cylinder pressure, a pressure in a combustion chamber formed in a cylinder. It is noted that, the rotation speed of the engine 11 varies according to the cylinder pressure. A result of frequency analysis of the cylinder pressure signal, which represents change in cylinder pressure, is substantially the same as a result of frequency analysis of the speed signal. Accordingly, the cylinder pressure signal correlates with the rotation signal. Further, a signal, which is equivalent to the acceleration signal representing acceleration, can be obtained by computing a rate of change of the cylinder pressure signal by differential computation or the like.

The inter-cylinder threshold is not limited to be set at a same value for each cylinder. As a third modification, the inter-cylinder threshold may be set at a different value for each cylinder. For example, the inter-cylinder threshold may be set at the same value for a pair of paired cylinders. The inter-cylinder threshold may be set at different values for non-paired cylinders, which are different from each other in the inter-cylinder threshold.

The ignition threshold, the inter-cylinder threshold, and the paired threshold are not limited to be variably set according to the operation state of the engine 11. As a fourth modification, the ignition threshold, the inter-cylinder threshold, and the paired threshold may be set at predetermined values specified beforehand. The predetermined value may be specified according to a rated output of the engine 11 and/or the like.

As a fifth modification, frequency analysis of the angular acceleration signal may be performed altogether for multiple cylinders. For example, a configuration may employ to compute the inter-cylinder component altogether for multiple cylinders. The present configuration sets the inter-cylinder threshold altogether for multiple cylinders.

As a sixth modification, a configuration may employ to determine whether the inter-cylinder component is smaller than the inter-cylinder threshold, without determination whether the ignition component is greater than the ignition threshold, and/or without determination whether the paired component is greater than the paired threshold.

As a seventh modification, the function of the misfire detection processing provided with the ECU 15 may be provided with a hardware and/or software different from the ECU 15 and may be provided with a combination of the hardware and the software. For example, the fuel injection system 10 may include a generation circuit, which generates the angular acceleration signal, and/or a computation circuit, which computes the ignition component, the paired component, and the inter-cylinder component, separately from the ECU 15. In this case, the generation circuit and/or the computation circuit may incorporate a configuration to execute partially or entirely the misfire detection processing.

As an eighth modification, the fuel injection system 10 may be employed in a vessel, a railroad vehicle, an airplane, and/or the like. The fuel injection system 10 may include an engine 11, which has a stationary configuration.

As described above, the configuration of the present disclosure includes the rotation acquisition unit S101, S102, the analysis unit S103, and the inter-cylinder determination unit S110. The rotation acquisition unit S101, S102 is configured to acquire the rotation signal correlated with the rotational state of the internal combustion engine 11. The analysis unit S103 is configured to perform frequency analysis of the rotation signal acquired with the rotation acquisition unit S101, S102. The inter-cylinder determination unit S110 is configured to determine whether the inter-cylinder component B is smaller than the inter-cylinder threshold Nb. The inter-cylinder threshold Nb represents occurrence of misfire. The inter-cylinder component B is a frequency component of the inter-cylinder cycle Tb. The inter-cylinder cycle Tb is a value computed by dividing the ignition cycle Ta by the number of cylinders of the internal combustion engine 11. The ignition cycle Ta is one burning cycle of the internal combustion engine 11.

The inventors obtained the following knowledge. Specifically, when noise is caused by disturbance, and when the noise arises on the rotation signal, in a state where misfire does not occur, and further when the occurrence cycle of the noise coincides with the ignition cycle, the inter-cylinder component of the rotation signal tends to become greater due to the noise and hardly becomes smaller. In view of the present knowledge, the present disclosure is made. Specifically, the configuration of the disclosure determines whether the inter-cylinder component is smaller than the inter-cylinder threshold. In this way, the configuration enables to determine occurrence of misfire only in a case where the inter-cylinder component is smaller than the inter-cylinder threshold. The configuration enables to avoid wrong determination that misfire occurs, even though misfire does not occur, even in a state where a noise arises in the rotation signal. Therefore, the present configuration enables proper detection of occurrence of misfire in the internal combustion engine 11 regardless of disturbance.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A misfire detection device comprising:
    a rotation acquisition unit configured to acquire a rotation signal correlated with a rotational state of an internal combustion engine;
    an analysis unit configured to perform frequency analysis of the rotation signal acquired with the rotation acquisition unit and to determine an inter-cylinder component, wherein the inter-cylinder component is a frequency component of an inter-cylinder cycle, the inter-cylinder cycle is a value computed by dividing an ignition cycle by a number of cylinders of the internal combustion engine, and the ignition cycle is one burning cycle of the internal combustion engine;
    an inter-cylinder determination unit configured to determine whether the inter-cylinder component is smaller than an inter-cylinder threshold representing occurrence of misfire; and
    a misfire detection unit configured to determine that misfire occurs in response to determination that the inter-cylinder component is smaller than the inter-cylinder threshold.

2. The misfire detection device according to claim 1, wherein
    the inter-cylinder determination unit is configured to determine whether the inter-cylinder component is smaller than the inter-cylinder threshold individually for each of the cylinders.

3. The misfire detection device according to claim 1, further comprising:
    a threshold setting unit configured to set the inter-cylinder threshold variably according to the operation state of the internal combustion engine.

4. The misfire detection device according to claim 1, further comprising:
    an Ignition determination unit configured to determine whether an ignition component is greater than an ignition threshold representing occurrence of misfire, wherein
    the ignition component is a frequency component of the ignition cycle.

5. The misfire detection device according to claim 1, further comprising:
    a paired determination unit configured to determine whether a paired component is greater than a paired threshold representing occurrence of misfire, wherein
    the paired component is a frequency component of, paired cycle, and
    the paired cycle is computed by dividing the ignition cycle by 2.

6. The misfire detection device according to claim 1, wherein
    the rotation acquisition unit includes an acceleration acquisition unit configured to acquire, as the rotation signal, an acceleration signal,
    the acceleration signal represents acceleration of a rotation of the internal combustion engine, and
    the analysis unit is configured to perform the frequency analysis on the acceleration signal acquired with the rotation acquisition unit.

* * * * *